Oct. 6, 1942.  S. N. BOBO  2,297,825
STEAK HOLDER FOR BROILING APPARATUS
Filed Oct. 12, 1940
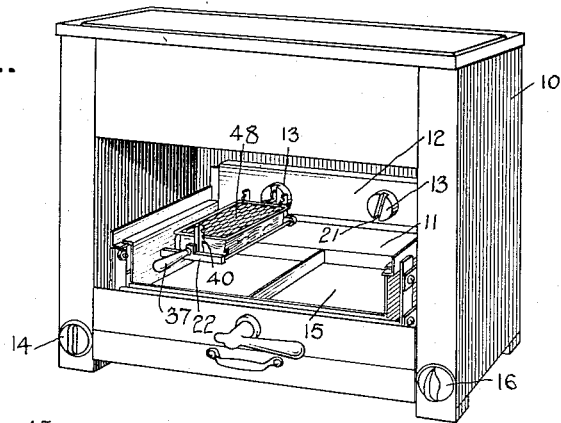
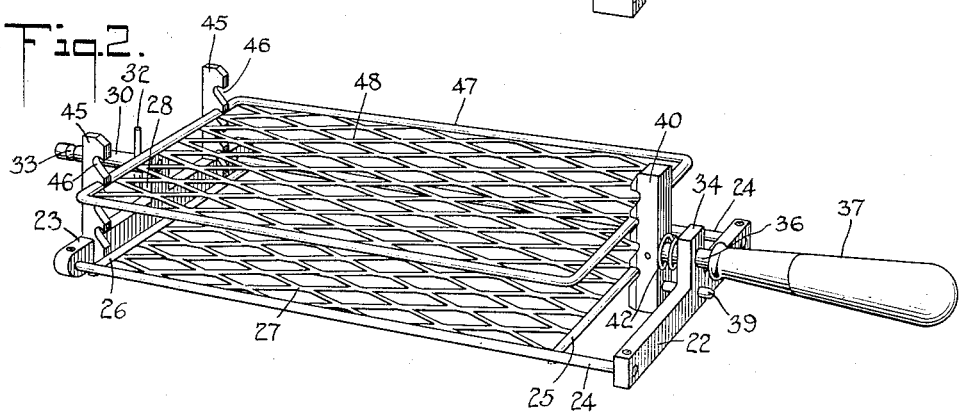
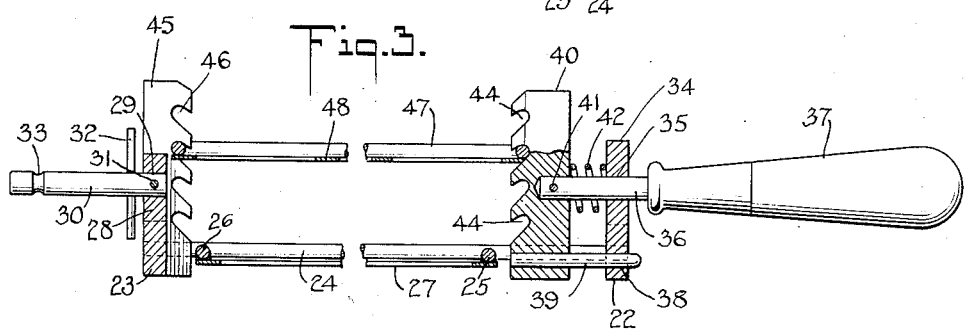
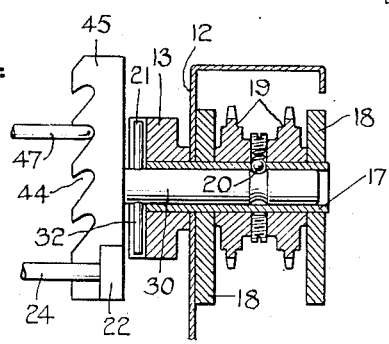
INVENTOR
Stephen N. Bobo
BY Henry J. Lucke
HIS ATTORNEY Patented Oct. 6, 1942

2,297,825

UNITED STATES PATENT OFFICE 2,297,825

STEAK HOLDER FOR BROILING APPARATUS

Stephen N. Bobo, New York, N. Y.

Application October 12, 1940, Serial No. 360,956

5 Claims. (Cl. 53—5)

My present invention relates to food cooking apparatus and more particularly to an improved steak holder for broilers.

In my co-pending application Serial No. 356,415, filed September 12, 1940, I have described and claimed an improved broiling or roasting apparatus in which the food to be broiled or roasted is mounted on a rotatable spit or spits.

My present invention is designed to be utilized in an apparatus as above referred to, and is adapted to be used in any type of broiling or roasting apparatus, but preferably an apparatus in which the food holding spit is rotatably mounted.

In carrying out my invention I provide a relatively small rectangular frame on which is fixedly mounted a grid or grill on which food may be placed to be afterwards broiled, and at one end of the frame I provide a plurality of standards having a serrated or notched edge. At the other end of the frame I provide a slidably mounted spring controlled shaft carrying a post at one end provided with notches or serrations at one edge thereof, and associated with the posts a grid or grill which cooperates with the first said grill to hold the food therebetween during the broiling or roasting operation. The grids thus form a rectangular cuboid or prism which defines a broiling chamber. Associated with the first said frame is a shaft and by means of which the entire device may be attached to a spit rotating means. The attaching means is such as to permit the device to be readily inserted in or removed from the broiling apparatus.

An object of my invention, therefore, is an improved food holding rack for roasting or broiling apparatus.

Another object of my invention is the provision of means for holding a substantially flat broad surface piece or section of food in position to be broiled in a rotatable broiler.

A further object of my invention is an improved food holding rack in which a plurality of grids is employed for holding food in broiling position.

In the accompanying drawing illustrating a preferred embodiment of my invention:

Fig. 1 is a perspective view of a broiler or roaster showing my present invention in operative position therein.

Fig. 2 is a perspective view of my improved food holder.

Fig. 3 is a section parallel in elevation of the device shown in Fig. 2 and illustrating the means for holding the food holding grids in operative association with each other, and Fig. 4 is a fragmentary section through the clutch and connecting mechanism of the broiling apparatus shown in Fig. 1.

Referring to the drawing, 10 designates a roaster or broiler made according to my invention as described and claimed in the application above referred to. Such broiling or roasting apparatus is provided with an open front chamber 11 therein and on the back wall 12 of which are located clutch or connector mechanisms 13, driven from any suitable source of power not shown, but ordinarily located in the rear of the broiling apparatus 10 and controlled by a switch 14 mounted on the front of the broiling apparatus 10. The broiling heat is ordinarily generated from gas and directs the heat downwardly toward a bottom plate or drip pan 15, the source of heat being controlled by the valve 16, also located on the front of the broiling apparatus 10.

A clutch or connector mechanism 13 is secured to a tubular member 17 rotatably mounted in bearings 18 forming part of the structure shown in Fig. 1, and provided with sprocket wheels 19 for connection with driving mechanism (not shown). Also, associated with the tubular member 17 is a spring ball clutch 20 for a purpose to be hereinafter described. The front face of the clutch or connecting mechanism 13 is provided with a transverse slot 21, adapted for engagement with means carried by the food holding grill of my present invention.

Referring to Figs. 2 and 3, there is shown front and rear cross bars 22 and 23, respectively. Secured in said bars 22 and 23 and adjacent the ends thereof are rods 24. The rods 24 may be of any suitable length and are arranged parallel to each other and being secured to the cross bars 22 and 23 there is formed a relatively rigid frame. Adjacent the cross bar 22 and secured at its ends to the rods 24 is a cross rod 25. Adjacent the cross bar 23 and secured at its ends to the rod 24 is a cross rod 26. The form of connection of the rods 25 and 26 with the rods 24 may be anything desired, but for ease in manufacturing I prefer to electrically weld the elements together. The rods 25 and 26 are substantially parallel to each other and extend substantially at right angles to the rods 24. Preferably welded to the rods 24, 25 and 26 is a rectangular sheet of expanded metal 27 on which food, such as steak, may be placed for broiling.

Formed integral with the cross bar 23 at its upper edge, is a standard 28 and centrally located with respect to the ends of such standard is a perforation 29 in which fits one end of a shaft 30, such shaft being secured in the perforation 29 preferably by a pin 31. Adjacent the standard 28, the shaft 30 is provided with a transverse rod 32 for a purpose to be hereinafter described.

Adjacent the other end of the shaft 30 is a circumferential groove 33. The diameter of the shaft 30 is substantially equal to the internal diameter of the tubular member 17, on which the clutch or connecting mechanism is mounted. Circumferential groove 33 in such shaft cooperates with the spring ball clutch 20 to removably hold the shaft 30 and all parts carried thereby in removable relation to the tubular member 17. Also, the transverse bar 32 carried by the shaft 30 cooperates with the transverse groove 21 in the clutch or connector mechanism 13 when the spring ball clutch 20 is in engagement with the annular groove 33, so that upon rotation of the tubular member 17 and parts carried thereby, the shaft 30 and all parts carried thereby will be rotated, the direction of rotation being immaterial.

On the upper edge of the cross bar 22 and substantially centrally thereof is a standard 34 provided with a perforation 35 in which is slidably mounted for axial movement a shaft 36. The shaft 36 is provided at one end with a handle 37 and by means of which not only may the shaft 30 be axially mounted, but the entire apparatus may be carried. Directly beneath the perforation 35 in the standard 34, the cross bar 22 is provided with a perforation 38, and in which perforation is slidably mounted a shaft 39. The shaft 39 is secured to the lower end of a vertically arranged block 40, while the shaft 36 is secured to such block intermediate its ends by a pin 41. On the shaft 36 and between the end face of the block 40 and the standard 34 is a coil spring 42 which constantly urges the block 40 away from the standard 34, or to the left as shown in Figs. 2 and 3. The front edge of the block 40 is provided with a plurality of notches 44, for a purpose to be hereinafter described.

Secured to or formed integral with the cross bar 23 and arranged adjacent the ends of the bar 23 are the uprights or standards 45. These standards are provided on the inner face with a plurality of notches or serrations 46 similar to the notches or serrations 44 in the standard 40 and like the notches or serrations 44 in the standard 40 are adapted to engage with or be engaged by the rectangular frame 47.

47 designates a rectangular frame of wire rod having the space defined thereby filled with a grid 48 of expanded metal, the size and shape of the grid 48 being substantially equal to the size and shape of the grid 27 above described as having been secured to the rods 24, 25 and 26, and carried by the end bars 22 and 23. The diameter of the wire forming the rectangular frame 47 is such as to engage readily with the notches 44 and 46 in the standards 40 and 45, respectively.

When the device is to be used for the holding of a steak that is to be broiled, the framework 47 is removed from the position shown in Fig. 2 and the steak or other piece of meat to be broiled is placed on the grid of expanded metal 27. The operator then places the end of the framework 47 in a pair of appropriate notches in the standards 45 and then forces the other end of the frame 47 downward into the position with such of the notches 44 in the standard 45 as will necessitate considerable pressure being placed on the meat to be broiled. The grids 27 and 48 thus form a rectangular cuboid or prism which defines a broiling chamber. During this operation, the operator may, by pulling on the handle 37, bring the standard 40 into such position as to allow the frame 47 to be readily associated with the standard 40. When thus placed in the position the steak may be put in broiling position in the device shown in Fig. 1 by the operator, who merely grasps the handle 37 and carries the entire structure to the broiling apparatus, forces the shaft 30 into the tubular member 17 until the spring ball clutch 20 cooperates with the annular groove 33 of shaft 30 and the transverse bar 32 engages in the transverse groove 21 in the clutch or connector mechanism 13.

By manipulating the switch 14 power is thrown on to rotate the tubular member 17 and connector mechanism 13, thus rotating the entire broiler elements of the apparatus illustrated in Figs. 2 and 3, thus submitting all sides of the steak or other food held between the grids 27 and 48 to the broiling heat of the device 10.

After the broiling operation has been completed the operator may, by grasping the handle 37, readily pull the shaft 30 out of the tubular member 17, and also by placing the device shown in Fig. 2 on a support and holding the bar 22 stationary, the operator, by pulling on the handle 37, may compress the spring 42 to permit the upright member 40 to be removed from engagement with the grid frame 47, and whereupon such grid frame 47 may be removed from the cooked food. After this operation the food may be removed from the grid 27 in the usual manner.

Whereas I have described my invention by reference to specific forms thereof, it will be understood that many changes and modifications may be made without departing from the spirit of the invention.

I claim:

1. An improved broiling apparatus comprising, a rectangular frame, a shaft extending outwardly therefrom at one end thereof by means of which the rectangular frame may be mounted, a food broiler grid mounted on said rectangular frame, a shaft slidably mounted in the end of the rectangular frame remote from the first named shaft and in substantial alignment therewith, an upright secured to the end of the shaft within the confines of the rectangular frame and means for yieldingly forcing said upright toward the end of the rectangular frame carrying the shaft, a second rectangular grid frame being provided with a broiler grid, and notches on said upright spaced along the lengths of said upright for receiving and holding the second said broiler grid.

2. An improved broiling apparatus comprising a rectangular frame, a cross bar at one end thereof, a shaft extending outwardly from the cross bar and by means of which the rectangular frame may be mounted on a rotatable support, a food broiler grid mounted on said rectangular frame, a pair of spaced uprights extending upwardly from said cross bar and mounted adjacent the ends thereof, each said upright being provided with notches on one face thereof along the length of the upright, a cross bar mounted at the other end of the rectangular frame, a shaft slidably mounted in said latter cross bar and in substantial alignment with the first said shaft, a handle on said slidable shaft, an upright secured to the end of said shaft remote from the handle and within the confines of the rectangular frame, said upright being provided with notches arranged along the length thereof, a compression spring on said latter shaft located between the upright and the cross bar whereby said shaft is urged inwardly toward the first said shaft and carrying the upright therewith, a second grid frame, a broiler grid mounted thereon, and said second grid frame being positioned in any desired parallel relation to the first grid frame on the notches formed in the said upright.

3. An improved broiling apparatus, including a frame, a shaft extending outwardly therefrom at an end thereof, said shaft being adapted to rotatably support said frame, a grid carried by said frame, a second grid frame, and means for removably securing said second frame to the first named frame, said means including a shaft slidably mounted on said first named frame, means on said slidable shaft for removably engaging said second frame, and means for yieldably urging said frame engaging means into engagement with said second frame.

4. An improved broiling apparatus as defined in claim 2, further characterized by the notches on said uprights being inclined at an angle thereto.

5. An improved broiling apparatus as defined in claim 2, further characterized by the last named upright having a second shaft slidably engaging the cross-bar to prevent rotation of the upright with respect to the cross-bar.

STEPHEN N. BOBO.